Figure 1:
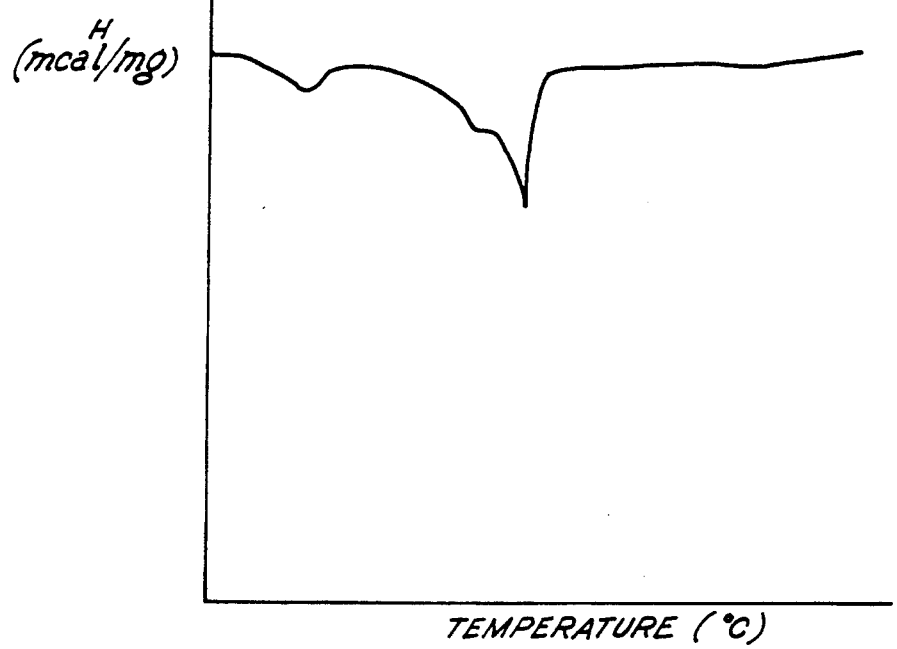

United States Patent [19]

Arendt

[11] Patent Number: 5,091,454

[45] Date of Patent: Feb. 25, 1992

[54] HOT MELT ADHESIVE COMPOSITION

[75] Inventor: William D. Arendt, Mundelein, Ill.

[73] Assignee: Velsicol Chemical Corporation, Rosemont, Ill.

[21] Appl. No.: 668,089

[22] Filed: Mar. 12, 1991

Related U.S. Application Data

[62] Division of Ser. No. 227,705, Aug. 3, 1988, Pat. No. 5,026,756.

[51] Int. Cl.$^5$ ................................................. C08K 5/09
[52] U.S. Cl. ..................................... 524/293; 524/487; 524/488
[58] Field of Search .................... 524/293, 487, 488

[56]  References Cited

U.S. PATENT DOCUMENTS

| | | | |
|---|---|---|---|
| 4,284,641 | 8/1981 | Cancio et al. | 525/58 X |
| 4,431,760 | 2/1984 | Giddings et al. | 524/293 X |
| 4,525,234 | 6/1985 | Herold et al. | 524/293 X |
| 4,745,026 | 5/1988 | Tsukahara et al. | 428/323 |
| 4,767,813 | 8/1988 | Evitt | 524/293 |

OTHER PUBLICATIONS

Sunstar, Japan Abstract, vol. II, No. 268 (C-444).
Toagosei, Japan Abstract, vol. II, No. 282 (C-446).
Mitsui Petrochemical Industries, Ltd., Chemical Abstracts, vol. 104, No. 26, Jun. 30, 1986, abstract 225810e.

*Primary Examiner*—Joseph L. Schofer
*Assistant Examiner*—J. M. Reddick
*Attorney, Agent, or Firm*—Allegretti & Witcoff, Ltd.

[57]  ABSTRACT

An adhesive composition comprising a polymer, a tackifier, a wax and a plasticizing amount in the range of 5–40% by weight of 1,4-cyclohexane dimethanol dibenzoate.

1 Claim, 6 Drawing Sheets

DSC CURVE FOR 1,4-CYCLOHEXANE DIMETHANOL DIBENZOATE

DSC CURVE FOR ELVAX 250

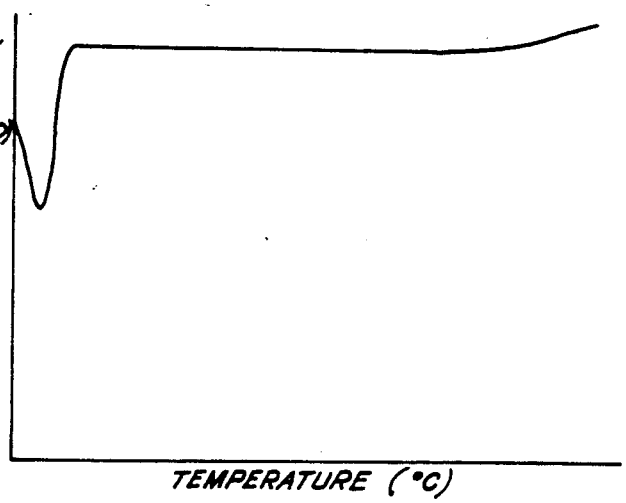
Fig. 3 — DSC curve for paraffin wax
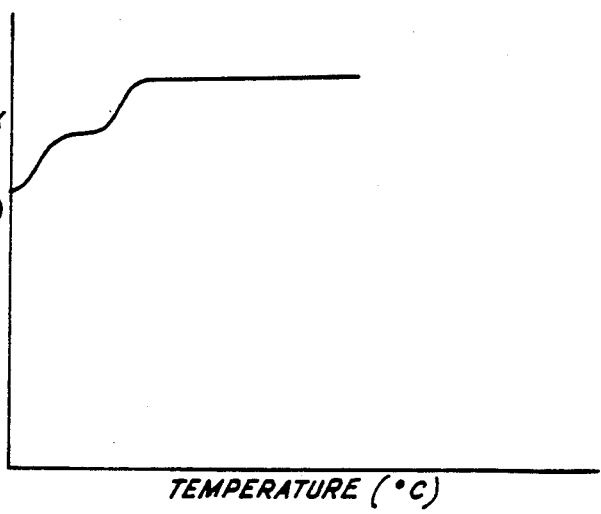
Fig. 4 — DSC curve for microcrystalline wax
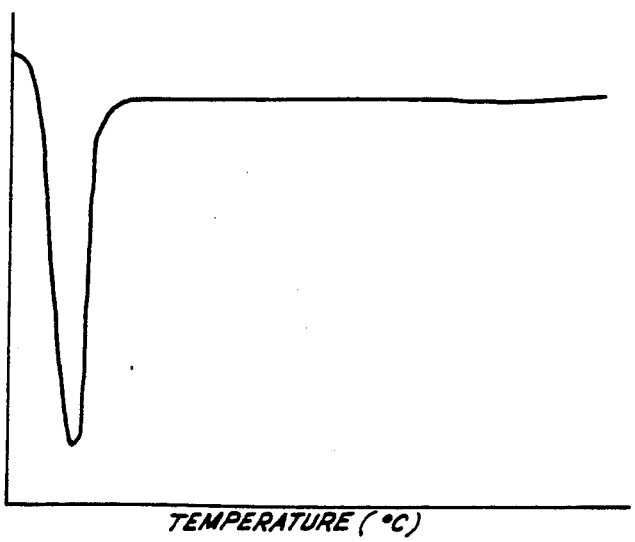
Fig. 5 — DSC curve for dicyclohexyl phthalate

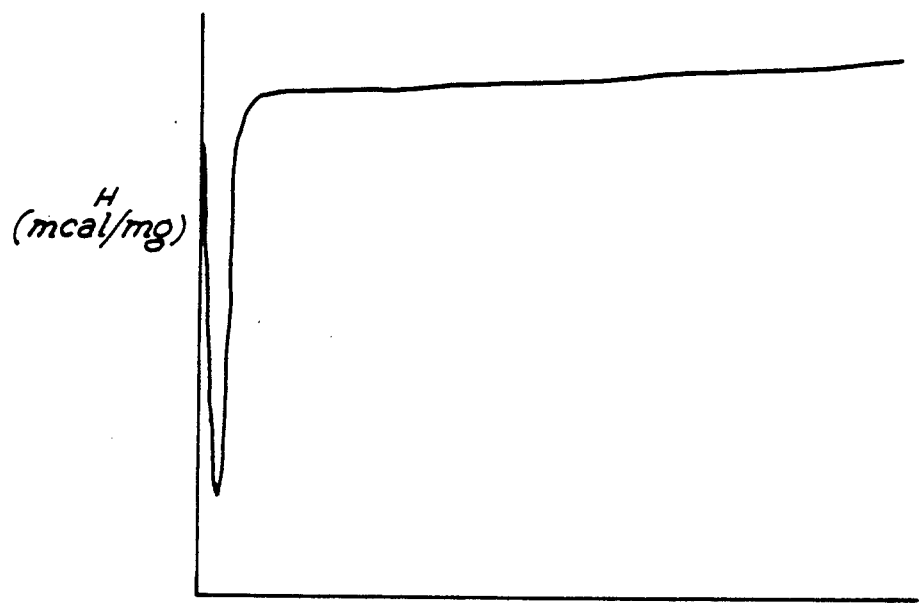
Fig. 6 DSC CURVE FOR TRIPHENYL PHOSPHATE
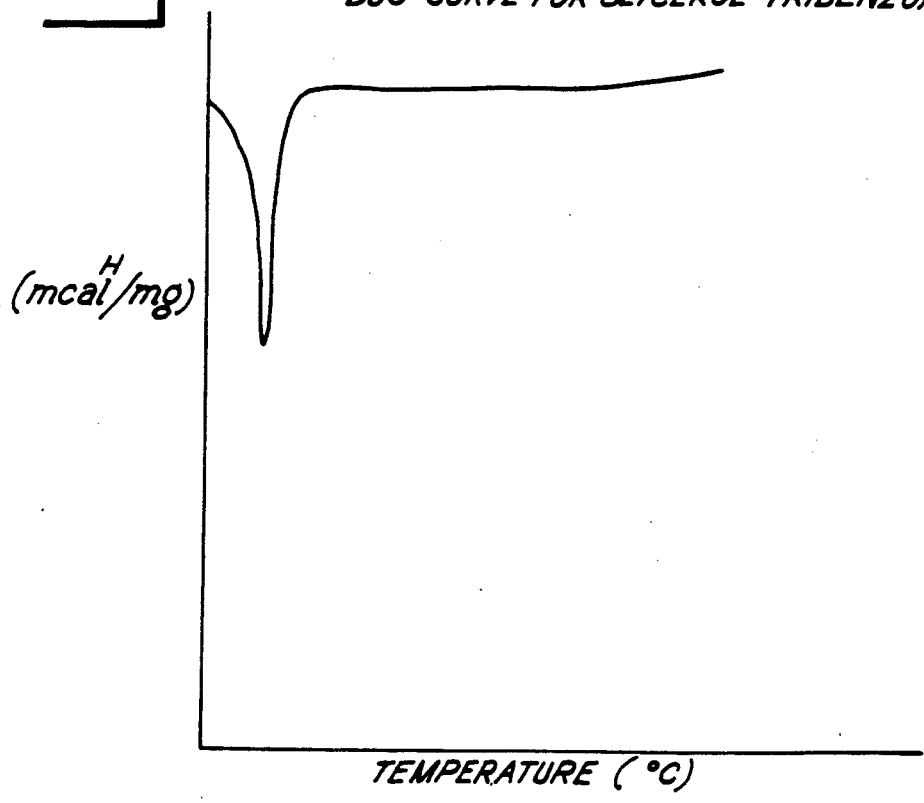
Fig. 7 DSC CURVE FOR GLYCEROL TRIBENZOATE

DSC CURVE FOR NEOPENTYLBENZOATE

DSC CURVE FOR PENTAEYTHRITOL TETRABENZOATE

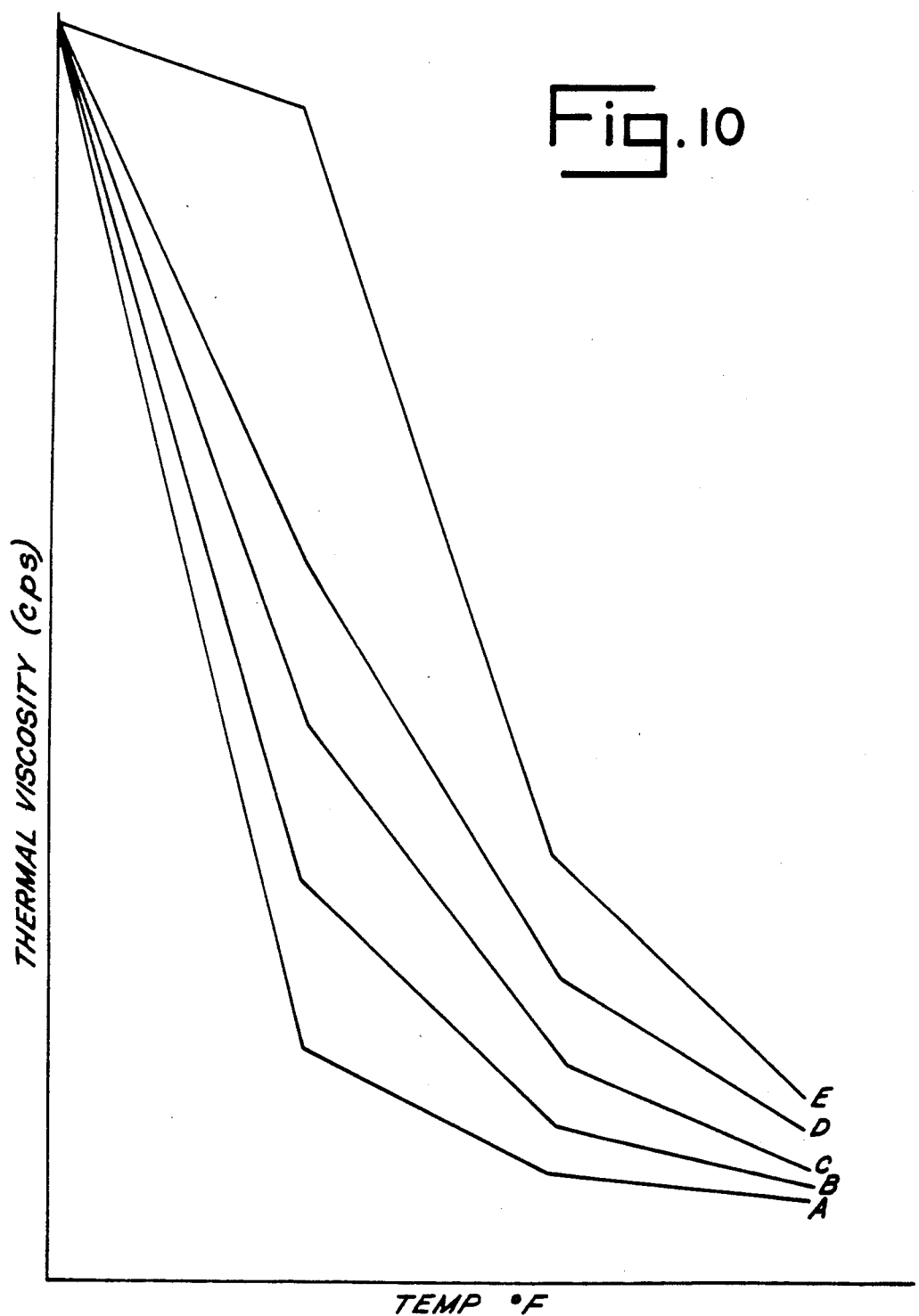

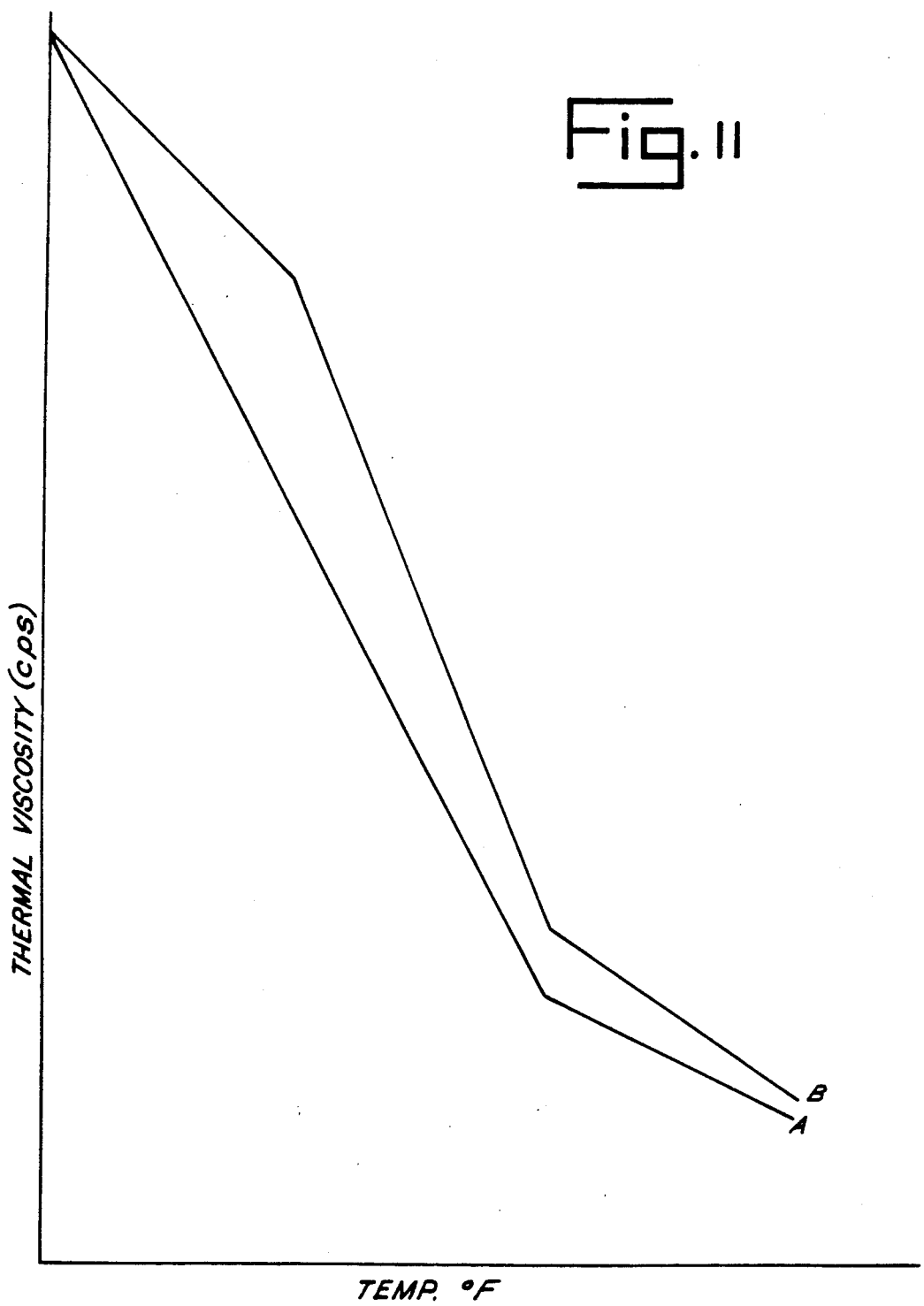

HOT MELT ADHESIVE COMPOSITION

This is a divisional of application Ser. No. 227,705, filed Aug. 3, 1988, now U.S. Pat. No. 5,026,756.

BACKGROUND OF THE INVENTION

Hot melt adhesive compositions are typically thermoplastic materials which are solid at room temperature. When heated to a liquid or molten form, the hot melt adhesive can be applied to a first substrate. The hot melt adhesive can then join the first substrate together with a second substrate as the hot melt adhesive cools back to a solid.

Hot melt adhesives are generally composed of three components: (1) a polymer; (2) a tackifier; and (3) a wax. The polymer provides strength and adhesive characteristics. The tackifier allows the polymer to be more adhesive by improving wetting during the application. The tackifier is typically necessary in preferred compositrions. The wax reduces the overall viscosity of the adhesive, thereby allowing the adhesive to liquify for a hot melt application at lower temperatures. The wax also controls the set time of the system—i.e. the time required to solidify the adhesive once the first and second substrates are compressed together.

Other components such as plasticizers are used in the formulation of hot melt adhesives for various applications. Plasticizers reduce the overall viscosity of the adhesive and promote flexibility and wetting. Typical types of plasticizers used are phthalates, glycolates, polybutenes, and mineral oil. See "Adhesive Bonding", Chap. 8 Hot-melt Adhesives, by Thomas Flanagan, at p. 8-3, published my MacMillan.

Waxes can adversely affect the adhesion characteristics of the polymer. In addition, waxes are not compatible with polymers with high vinyl acetate contents. Thus, plasticizers are used in some applications instead of waxes. Examples of plasticizers are given in U.S. Pat No. 4,745,026, such as dicyclohexyl phthalate.

Of particular importance is the change in heat, i.e. $\Delta H$, as the hot melt adhesive changes from one phase to another. The lower the $\Delta H$, the less heat is required to convert the solid adhesive to the liquid phase. $\Delta H$ is proportional to melt down rate, i.e., the rate of melt down of the adhesive from a solid phase to the liquid phase. Adhesives that melt down to a liquid phase quickly and easily can be used in faster manufacturing applications than adhesives with slower melt down rates. Therefore the lower the $\Delta H$, and the faster the melt down rate, the easier the adhesive is to work with in manufacturing applications. See 1988 Hot Melt, "Thermal Analyses as a Predictor of Performance", by Ernest F. Eastman, published in 1988 TAPPI Conference Papers. $\Delta H$ values can be readily determined using Differential Scanning Calorimeters (Perkin-Elmer).

Another major factor in hot melt adhesive compositions is compatibility—i.e. the degree of solubility of one component in another. The greater the compatibility, the more uniform and homogeneous the adhesive, and the better the bond the adhesive will provide. The closer the solubility parameters of different components are to each other, the greater the compatibility. See "Some Factors Affecting the Solubility of Polymers", by P. A. Small, J. Appl. Chem., 3, Feb. 1953 (which teaches how to predict solubility parameters).

Compatibility is related to cloud point temperature. Cloud point temperature is the temperature at which a component begins to solidify or "cloud up" as it cools from a clear liquid phase to the solid phase. For example, for waxes, the cloud point is usually the melting point of the wax. Generally, the lower the cloud point temperature, the greater the compatibility. See "Adhesives and Coatings Manual" by National Distillers and Chemical Corporation (1983).

As previously mentioned, set time is the time required to solidify the adhesive once the first and second substrates are compressed together. Fast set times are desirable in most manufacturing applications. Generally, the higher the melting point, the crystallinity, and the viscosity, the faster the set time. Id. Open time is the time during which the adhesive is applied to the first substrate and remains sufficiently molten to effect a bond between the first and second substrates. Long open times are desirable in most manufacturing applications. Generally, the lower the melting point, the crystallinity, and the viscosity, the longer the open time. Id.

Thus, it is desirable to have a highly crystalline adhesive component that has both high-melting-point and low-melting-point characteristics.

The primary objective of the present invention is to provide a hot melt adhesive composition containing 1,4-cyclohexane dimethanol dibenzoate as a unique component. The physical properties of 1,4-cyclohexane dimethanol dibenzoate indicate that it would be an improvement over existing hot melt adhesive components such as dicyclohexyl phthalate. More specifically, 1,4-cyclohexane dimethanol dibenzoate provides shorter set times than dicyclohexyl phthalate without adversely affecting open times.

In addition, 1,4-chclohexane dimethanol dibenzoate has a slightly lower $\Delta H$ than dicyclohexyl phthalate. Although other solid benzoates may have a lower $\Delta H$ than 1,4-cyclohexane dimethanol dibenzoate, they tend to super cool. During the cool down cycle, these other solid benzoates that super cool remain liquid in the system and act as liquid plasticizers would act, i.e., resulting in longer open times and adversely affecting set times. 1-4, cyclohexane dimethanol dibenzoate is highly crystalline and does not super cool.

Furthermore, the 4,4-cyclohexane dimethanol dibenzoate would be very useful as a polyester hot melt modifier. The crystalline nature of the 1,4-cyclohexane dimethanol dibenzoate would contribute significantly to the properties of a polyester hot melt (e.g., faster set time, improved viscosity reduction, etc.). Further, the polyester hot melts containing the 1,4-cyclohexane dimethanol dibenzoate would be useful in applications not now possible without it. Polyesters are generally not compatible with waxes and are not easily modified by waxes. U.S. Pat. Nos. 4,172,824, and 4,340,526 teach that certain benzoates are of use in polyester hot melts. However, the cited benzoates are limited in nature due to their tendency to super cool. The 1,4-cyclohexane dimethanol dibenzoate is an improvement over these prior art benzoates.

The use of polyesters comprising 1,4-cyclohexane dimethanol as a hot melt adhesive when blended with certain monomeric ester plasticizers is taught in U.S. Pat No. 4,340,526. However, this patent does not teach the use of 1,4-cyclohexane dimethanol dibenzoate as a plasticizer in a hot melt adhesive cmposition.

SUMMARY OF THE INVENTION

It has now been discovered that a hot melt adhesive composition comprising a polymer, a tackifier, and a plasticizing amount of 1,4-cyclohexane dimethanol dibenzoate works well as a hot melt adhesive. More particularly, it has been discovered that a hot melt adhesive composition comprising ethylene vinyl acetate as the polymer, a tackifier, and a plasticizing amount of 1,4-cyclohexane dimethanol dibenzoate is a suitable hot melt adhesive. In the present invention, the adhesive comprises a range of about 5-40% by weight of 1,4-cyclohexane dimethanol dibenzoate. More preferably, the adhesive comprises a range of about 25-35% by weight of 1,4-cyclohexane dimethanol dibenzoate. Most preferably, the adhesive comprises about 30% by weight of 1,4-cyclohexane dimethanol dibenzoate.

It has also been discovered that a hot melt adhesive composition comprising a polymer, a tackifier, a wax, and a plasticizing amount of 1,4-cyclohexane dimethanol dibenzoate is suitable as a hot melt adhesive. In such a composition, the adhesive comprises a range of about 5-40% by weight of 1,4-cycloohexane dimethanol dibenzoate. More preferably, this adhesive comprises a range of about 8-25% by weight of 1,4-cyclohexane dimethanol dibenzoate. Most preferably, the adhesive comprises about 16.6% byh weight of 1,4-cyclohexane dimethanol dibenzoate.

In addition, based on solubility parameters, it is anticipated that 1,4-cyclohexane dimethanol dibenzoate would work well in hot melt adhesive formulations having other polymers, such as polyvinyl acetate, ethylene/vinyl acetate copolymer, block copolymers (styrene-isoprene-styrene, styrene-butadiene-styrene, styrene-isobutylene-styrene), polyvinyl chloride, polyvinyl chloride/polyvinyl acetate, polyurethanes, polyesters and polyamides. Specifically, the solubility parameter of 1,4-cyclohexane dimethanol dibenzoate is about 8.0. Comparison of this value with, for example, those listed on p. 76 of the P. A. Small article cited above, indicates that 1,4-cyclohexane dimethanol dibenzoate is compatible with many different polymers.

For example, it is known that glycerol tribenzoate functions very well in polyester hot melt applications. Since 1,4-cyclohexane dimethanol dibenzoate has a similar solubility parameter as glycerol tribenzoate, it would be expected that 1,4-cyclohexane dimethanol dibenzoate would also work well in polyester hot melt applications. It is expected that 1,4-cyclohexane dimethanol dibenzoate is advantageous over glycerol tribenzoate in that 1,4-cyclohexane dimethanol dibenzoate has a significantly higher melting point resulting in faster set times without adversely affecting open times.

Furthermore, it has been discovered that compared to prior art compositions, 1,4-cyclohexane dimethanol dibenzoate requires a lower amount of heat to change from its solid to its liquid phase, and provides faster set times without adversely affecting open times.

1,4-cyclohexane dimethanol dibenzoate has the following structure wherein the dimethanol dibenzoate groups can be cis or trans and the cyclohexane ring can have either a chair or boat configuration:

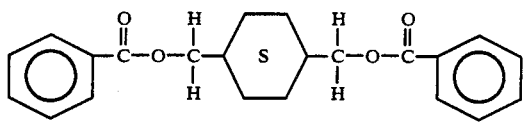

The following examples of the present invention demonstrate the advantages of the present invention over the prior art.

EXAMPLES

The Differential Scanning Calorimeter ("DSC") curves for 1, 4-cyclohexane dimethanol dibenzoate are depicted in FIG. 1. The curve shown is binodal and shows that this molecule has both high melting point and low melting point characteristics. The sharpness of the primary curve demonstrates that 1,4-cyclohexane dimethanol dibenzoate is highly crystalline. Because of the binodal curve, the melting point is at two different temperatures, namely about 123° C. at the primary curve and about 80° C. at the secondary curve. The ΔH is about 8.85 mcal/mg.

Figure 2:
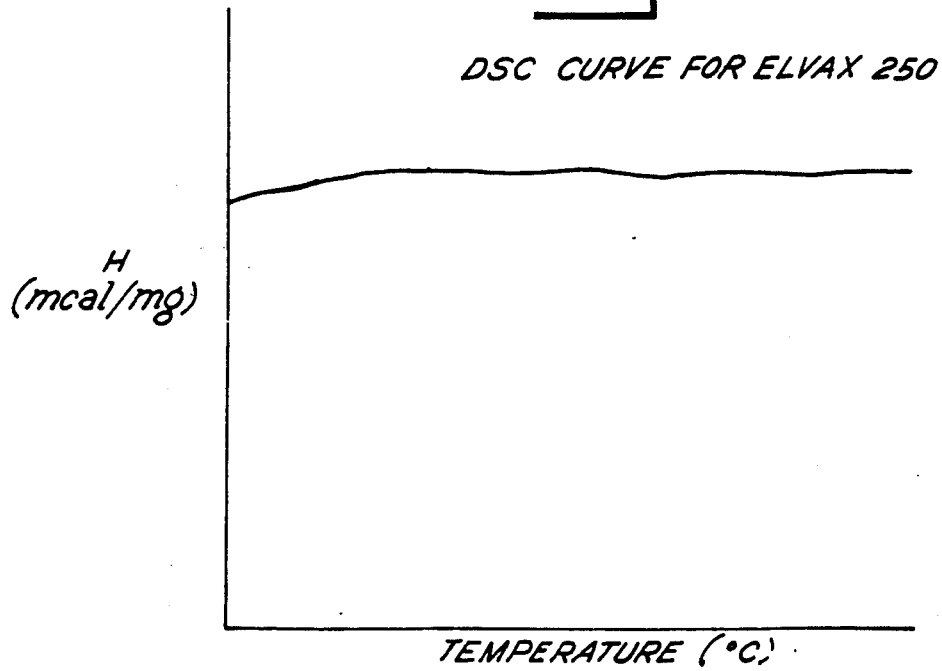

FIG. 2 is the DSC curve for a ethylene vinyl acetate compound Elvax 250 made by E.I. duPont de Nemours Company, having a melt Index of 22-28 and comprising 28% vinyl acetate.

Figure 8:
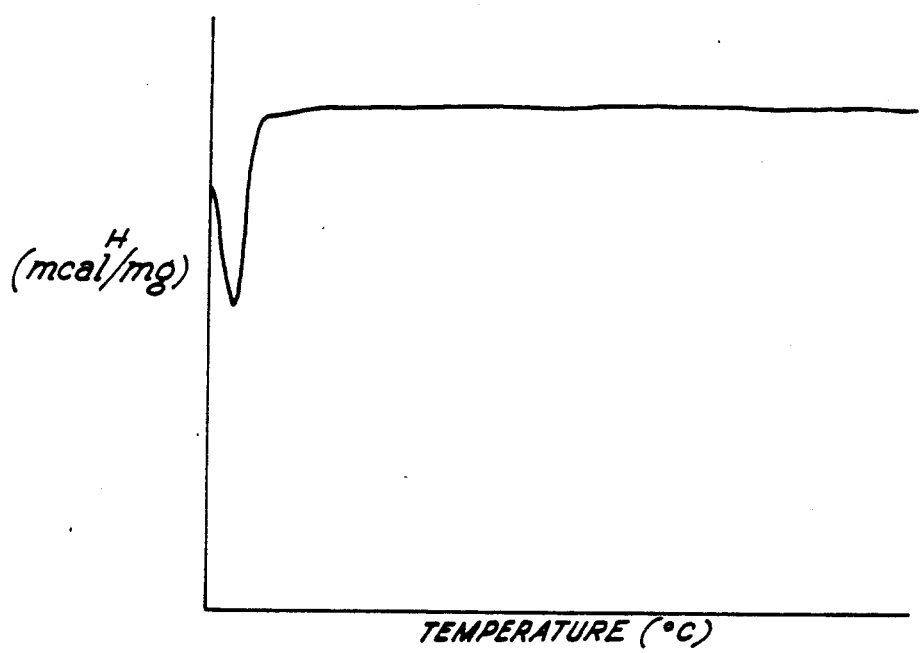
Figure 9:
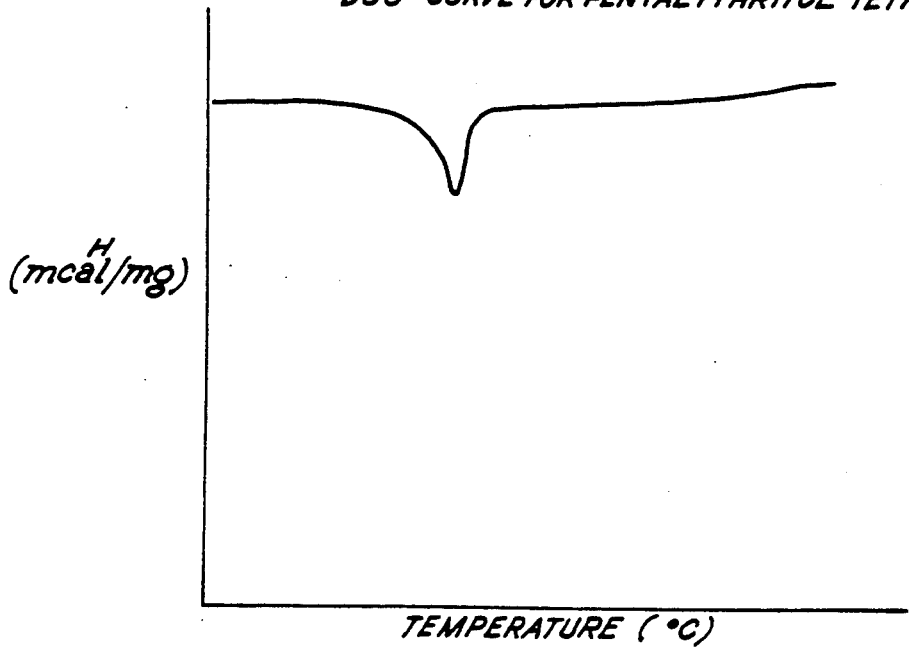

FIG. 3 is the DSC curve for paraffin wax.
FIG. 4 is the DSC curve for microcrystalline wax.
FIG. 5 is the DSC curve for dicyclohexyl phthalate.
FIG. 6 is the DSC curve for triphenyl phosphate.
FIG. 7 is the DSC cukrve for glycerol tribenzoate.
FIG. 8 is the DSC curve for neopentyl benzoate.
FIG. 9 is the DSC curve for pentacrythritol tetrabenzoate.

FIG. 10 shows curves of thermal viscosity versus temperature for various adhesive compositions. FIG. 10 demonstrates the affect 1,4-cyclohexanol dimethanol dibenzoate has in decreasing the thermal viscodity of adhesive compositions. Thermal viscosity was determined using a Brookfield RVT Viscometer and Thermosel.

FIG. 11 shows curves of thermal viscosity versus temperature for two different adhesive compositions, one containing 1,4-cyclohexane dimethanol dibenzoate and one containing dixyclohexyl phthalate. FIG. 11 demonstrates that at a specific temperature, the composition containing 1,4-cyclohexane dimethanol dibenzoate has a lower thermal viscosity than the composition containing dixyclohexyl phthalate. Thermal viscosity was determined using a Brookfield RVT Viscometer and Thermosel.

TABLE I

Table I is a summary of stat taken from Graph I for the plasticizer of the present invention, 1,4-cyclohexane dimethanol dibenzoate and Graphs III-IX for prior art plasticizers and waxes.

As shown in Table I,1,4-cyclohexane dimethanol dibenzoate is the only adhesive component which had all the following advantageous characteristics:

Low ΔH, high melting point, high crystallinty as shown by the sharpness of the primary curve, and a binodal curve.

TABLE I

| Plasticizer Or Wax | ΔH (mcal/mg) | Melting Point (°C.) | Sharpness of Primary Curve | Binodal Curve |
|---|---|---|---|---|
| 1,4-cyclohexane dimethanol dibenzoate | 8.85 | 80,123 | extremely sharp | Yes |
| Paraffin Wax | 16.80 | 69 | moderate | No |
| Microcrystalline Wax | 16.60 | 64,80 | not sharp | Yes |

TABLE I-continued

| Plasticizer Or Wax | ΔH (mcal/mg) | Melting Point (°C.) | Sharpness of Primary Curve | Binodal Curve |
|---|---|---|---|---|
| Dicyclohexyl Phthalate | 9.94 | 70 | moderate | No |
| Triphenyl Phosphate | 9.25 | 54 | moderate | No |
| Glycerol Tribenzoate | 4.53 | 73 | moderate | No |
| Neopentyl Benzoate | 5.09 | 54 | moderate | No |
| Pentaerythritol Tetrabenzoate | 6.78 | 103 | moderate | No |

TABLE II

Table II shows cloud point temperatures (°F.) and consisting of a 1:1 mixture of various polymers containing vinyl acetate and various plasticizer benzoates, including in Column 4 for plasticizer 1, mixtures containing the adhesive component of the present invention, 1,4-cyclohexane dimethanol dibenzoate.

Table II shows that when the plasticizer 1,4-cyclohexane dimethanol dibenzoate constitutes 50% parts by weight of the adhesive composition, it acts much like a wax. Table II also gives an estimate on the upper limits of the % plasticizer in mixture with polymers before compatibility begins to become adversely affected. Thus, in the present invention the 1,4-cyclohexane dimethanol dibenzoate in the adhesive is preferably less than 50% parts by weight.

onstrates that adhesive compositions with 1,4-cyclohexane dimethanol dibenzoate and Elvax 150 had lower cloud point temperatures than similar mixtures with Elvax 150 and the M-8800 and R-0855 waxes. This data confirms that 1,4-cyclohexane dimethanol dibenzoate has greater compatibility with Elvax 150 than M-8880 and R-0855 waxes.

TABLE III

| Polymer/ Plasticizer or Wax | % of Polymer to Plasticizer or Wax | Cloud Point Temp. °F. |
|---|---|---|
| Elvax 150/1,4-cyclohexane dimethanol dibenzoate | 75/25 | 134° |
| Elvax 150/1,4-cyclohexane dimethanol dibenzoate | 88/12 | 68° |
| Elvax 150/M-8880 | 50/50 | 184° |
| Elvax 150/M-8880 | 75/25 | 152° |
| Elvax 150/M-8880 | 88/12 | 150° |
| Elvax 150/R-0885 | 50/50 | 164° |
| Elvax 150/R-0885 | 75/25 | 150° |
| Elvax 150/R-0885 | 80/12 | 142° |

TABLE IV

Table IV shows cloud point temperatures for various polymers and other adhesive components. Elvax 250, as already described in Table II, is an ethylene vinyl acetate polymer with a melt index of 22-28 and 28% vinyl acetate in the polymer. Piccovar L60 is a low molecular weight, nonpolar, thermoplastic, alkylaryl hydrocarbon polymer modifier made by Hercules, Incorporated. Piccovar L60 has a density of 1.05 kg/L at 25° C., and a flashpoint of 243° C. Piccovar L60 has a melt viscosity

TABLE II

CLOUD POINT TEMPERATURE (°F.)/CONSISTENCY
1:1 MIXTURE OF POLYMER AND PLASTICIZER

| Ethylene Vinyl Acetate Polymer | Melt Index Of the Polymer | % Vinyl Acetate in the Polymer | Plasticizer 1 1,4-cyclohexane dimethanol dibenzoate | Plasticizer 2 1:1 Mixture of dipropylene glycol dibenzoate and diethylene glycol dibenzoate | Plasticizer 3 Neopentyl Benzoate | Plasticizer 4 Glycerol Tribenzoate | Plasticizer 5 Pentaerythritol tetrabenzoate |
|---|---|---|---|---|---|---|---|
| ELVAX 40W | 48-66 | 40% | 196° Cheesy, Plasticizer Crystallized out | <160 Smooth | <160 Smooth | <160 Smooth | 260 Smooth |
| ELVAX 150 | 38-48 | 33% | 210 Cheesy Plasticizer Crystallized | <160 Smooth | <160 Smooth | 262 Smooth | >350 Smooth |
| ELVAX 150W Anti Blocking Additive | 38-48 | 33% | 230° Cheesy Plasticizer Crystallized | <160 Smooth | <160 Smooth | 260 Smooth | >360 Smooth |
| ELVAX 210 | 365-440 | 28% | 262° Cheesy Plasticizer Crystallized | 190 Smooth | 204 Smooth | 260 Smooth | >360 Smooth |
| ELVAX 250 | 22-28 | 28% | 210° Cheesy Plasticizer Crystallized | 166 Smooth | <160 Smooth | 260 Smooth | >360 Smooth |
| ELVAX 260 | 53-67 | 28% | 188° Cheesy | <160 Smooth | <160 Smooth | 265 Smooth | >360 Smooth Not all went in |

TABLE III

Table III shows cloud point temperatures for various polymer/plasticizer or wax mixtures. M-8880 is microcrystalline wax with a melting point of 183° F. and R-0855 is a paraffin wax with a melting point of 153° F. Elvax 150, as already described in Table III is an ethylene vinyl acetate polymer with a melt index of 38-48 and a 33% vinyl acetate in the polymer. Table III demof 1 poise at 129° C., 10 poises at 97° C., and 100 poises at 77° C. H-100 is a tackifier and is specifically a hydrocarbon resin made by Eastman Chemical Products, Inc. under the trade name "Eastotac H-100". H-100 has a melting point >185° F., and a specific gravity of 1.04. Table IV shows that M-8880 and R-0855 waxes have no lower cloud point temperatures and thus no better compatibility than 1,4-cyclohexane dimethanol dibenzoate in mixtures with Piccovar L60 and Elvax 250, and H-100.

In addition, Table IV shows that 1,4-cyclohexane dimethanol dibenzoate, when mixed with Elvax 250 has a lower cloud point temperature and greater compatibility than mixtures of M-8880 and R-0855 waxes with Elvax 250.

Furthermore, Table IV shows that in a mixture of Elvax 250, H-100, M-8880, and 1,4-cyclohexane dimethanol dibenzoate, as the ratio of 1,4-cyclohexane dimethanol dibenzoate to M-8880 increases the cloud point temperature decreases, thereby indicating greater compatibility.

TABLE IV

| Polymer/Other Components | Ratio of polymer to other components | Cloud Point Temp. (°F.) |
|---|---|---|
| Elvax 250/1,4-cyclohexane dimethanol dibenzoate | 50/50 | 210° |
| Elvax 250/1,4-cyclohexane dimethanol dibenzoate | 75/25 | 140° |
| Elvax 250/M-8880 | 75/25 | 186° |
| Elvax 250/R-0855 | 75/25 | 168° |
| Piccovar L60/Elvax 250/1,4-cyclohexane dimethanol dibenzoate | 33/33/33 | 160° |
| Piccovar L60/Elvax 250/M-8880 | 33/33/33 | 160° |
| Piccovar L60/Elvax 250/R-0855 | 33/33/33 | 160° |
| Elvax 250/H-100/1,4-cyclohexane dimethanol dibenzoate | 33/33/33 | 160° |
| Elvax 250/H-100/M-8880 | 33/33/33 | 182° |
| Elvax 250/H-100/R-0855 | 33/33/33 | 160° |
| Elvax 250/H-100/M-8880/1,4-cyclohexane dimethanol dibenzoate | 33/20.5/20.5/25 | 178° |
| Elvax 250/H-100/M-8880/1,4-cyclohexane dimethanol dibenzoate | 33/8/33/25 | 190° |
| Elvax 250/H-100/M-8880/1,4-cyclohexane dimethanol dibenzoate | 33/33/8/25 | 163° |

TABLE V

Table V shows tensile strength and % elongation at break date for various adhesive compositions. Tensile strength was determined pursuant to ASTM D638-64T. Table V shows that in specific formulations, 1,4-cyclohexane dimethanol dibenzoate outperforms dicyclohexyl phthalate in terms of tensile strength and % elongation at break. Specifically, Table V shows formulas A.2 and A.8 have greater tensile strength than corresponding formulas B.2 and B.8. Table V also shows that formula C.1. has greater tensile strength and % elongation at break than corresponding formula D.1, and that C.4 has greater tensile strength than corresponding formula D.4.

TABLE V-A

| | Parts by Weight | | | | | |
|---|---|---|---|---|---|---|
| No. | Elvax 250 | H-100 | M-8880 wax | 1,4-cyclohexane dimethanol dibenzoate | Tensile strength (psi) | % Elongation at break |
| 1 | 100 | — | — | — | 847 | 400 |
| 2 | 75 | — | — | 25 | 423 | 54 |
| 3 | 50 | — | — | 50 | 128 | 10 |
| 4 | 75 | — | 25 | — | 514 | 28 |
| 5 | 50 | — | 50 | — | 721 | 20 |
| 6 | 30 | 30 | — | 30 | 69 | 10 |
| 7 | 30 | 30 | 30 | — | 540 | 20 |
| 8 | 30 | 30 | 15 | 15 | 603 | 26 |
| 9 | 30 | 15 | 15 | 30 | 172 | 10 |
| 10 | 30 | — | 30 | 30 | 53 | 10 |

TABLE V-B

| | Parts by Weight | | | | | |
|---|---|---|---|---|---|---|
| No. | Elvax 250 | H-100 | M-8880 wax | Dicyclohexyl phthalate | Tensile strength (psi) | % Elongation at break |
| 1 | 100 | — | — | — | 847 | 400 |
| 2 | 75 | — | — | 25 | 300 | 246 |
| 3 | 50 | — | — | 50 | 230 | 292 |
| 4 | 75 | — | 25 | — | 514 | 28 |
| 5 | 50 | — | 50 | — | 721 | 20 |
| 6 | 30 | 30 | — | 30 | 134 | 378 |
| 7 | 30 | 30 | 30 | — | 540 | 20 |
| 8 | 30 | 30 | 15 | 15 | 302 | 73 |
| 9 | 30 | 15 | 15 | 30 | 243 | 88 |
| 10 | 30 | — | 30 | 30 | 476 | 20 |

TABLE V-C

| | Parts by Weight | | | | | |
|---|---|---|---|---|---|---|
| No. | Elvax 250 | Piccovar L-60 | M-8880 wax | 1,4-cyclohexane dimethanol dibenzoate | Tensile strength (psi) | % Elongation at break |
| 1 | 30 | 30 | — | 30 | 288 | 646 |
| 2 | 30 | 30 | 30 | — | 472 | 126 |
| 3 | 30 | 30 | 15 | 15 | 234 | 128 |
| 4 | 30 | 15 | 15 | 30 | 523 | 20 |
| 5 | 30 | — | 30 | 30 | 53 | 10 |

TABLE V-D

| | Parts by Weight | | | | | |
|---|---|---|---|---|---|---|
| No. | Elvax 250 | Piccovar L-60 | M-8880 wax | dicyclohexyl phthalate | Tensile strength (psi) | % Elongation at break |
| 1 | 30 | 30 | — | 30 | 137 | 60 |
| 2 | 30 | 30 | 30 | — | 472 | 126 |
| 3 | 30 | 30 | 15 | 15 | 246 | 232 |
| 4 | 30 | 15 | 15 | 30 | 249 | 112 |
| 5 | 30 | — | 30 | 30 | 476 | 20 |

TABLE VI

Table VI shows cloud point temperatures for various adhesive compositions. Table VI shows that certain formulations having 1,4-cyclohexane dimethanol dibenzoate has the same cloud point temperatures and thus, the same compatibility as those of corresponding formulations containing dicyclohexyl phthalate. Specifically, A.10. through A. 13. has the same cloud point temperatures, and thus, the same compatibility as corresponding formulations B.10 through B.13.

TABLE VI-A

| | Parts by Weight | | | | | |
|---|---|---|---|---|---|---|
| No. | Elvax 250 | H-100 | Piccovar L-60 | M-8880 wax | 1,4-cyclohexane dimethanol dibenzoate | Temperature (°F.) |
| 1 | 75 | — | — | — | 25 | 460 |
| 2 | 75 | — | — | 25 | — | 186 |
| 3 | 50 | — | — | — | 50 | 210 |

TABLE VI-A-continued

| | | Parts by Weight | | | |
|---|---|---|---|---|---|
| No. | Elvax 250 | H-100 | Picco-var L-60 | M-8880 wax | 1,4-cyclohexane dimethanol dibenzoate | Temperature (°F.) |
| 4 | 50 | — | — | 50 | — | 180 |
| 5 | 30 | 30 | — | 30 | — | 182 |
| 6 | 30 | 30 | — | — | 30 | 160 |
| 7 | 30 | 30 | — | 15 | 15 | 184 |
| 8 | 30 | 15 | — | 15 | 30 | 188 |
| 9 | 30 | — | — | 30 | 30 | 180 |
| 10 | 30 | — | 30 | 30 | — | <160 |
| 11 | 30 | — | 30 | — | 30 | <160 |
| 12 | 30 | — | 30 | 15 | 15 | <160 |
| 13 | 30 | — | 15 | 15 | 30 | <160 |
| 14 | 30 | — | — | 30 | 30 | 180 |

TABLE VI-B

| | | Parts by Weight | | | | |
|---|---|---|---|---|---|---|
| No. | Elvax 250 | H-100 | Picco-var L-60 | M-8880 wax | dicyclohexyl phthalate | Cloud Point Temperature (°F.) |
| 1 | 75 | — | — | — | 25 | <160 |
| 2 | 75 | — | — | 25 | — | 186 |
| 3 | 50 | — | — | — | 50 | <160 |
| 4 | 50 | — | — | 50 | — | 180 |
| 5 | 30 | 30 | — | 30 | — | 182 |
| 6 | 30 | 30 | — | — | 30 | <160 |
| 7 | 30 | 30 | — | 15 | 15 | <160 |
| 8 | 30 | 15 | — | 15 | 30 | <160 |
| 9 | 30 | — | — | 30 | 30 | <160 |
| 10 | 30 | — | 30 | 30 | — | <160 |
| 11 | 30 | — | 30 | — | 30 | <160 |
| 12 | 30 | — | 30 | 15 | 15 | <160 |
| 13 | 30 | — | 15 | 15 | 30 | <160 |
| 14 | 30 | — | — | 30 | 30 | <160 |

TABLE VII

Table VII shows temperature and viscosity data for various adhesive compositions. Table VII shows that as 1,4-cyclohexane dimethanol dibenzoate is substituted for tackifier H-100, the viscosity of the composition is dramatically reduced. Viscosity was determined using a Brookfield RVT Viscometer and Thermosel.

TABLE VII

| Ratio of Parts by Weight Adhesive Components | | | | Temperature (°F.) | Viscosity (cps) |
|---|---|---|---|---|---|
| Elvax 250 | M-8880 wax | H-100 | 1,4-cyclohexane dimethanol dibenzoate | | |
| 1 | 1 | 1 | — | 250 | 1250 |
| | | | | 300 | 450 |
| | | | | 350 | 225 |
| 1 | — | 1 | 1 | 250 | 2650 |
| | | | | 300 | 950 |
| | | | | 350 | 425 |
| 1 | 1 | — | 1 | 250 | 525 |
| | | | | 300 | 275 |
| | | | | 350 | 175 |
| 1 | .5 | 1 | .5 | 250 | 1600 |
| | | | | 300 | 700 |
| | | | | 350 | 325 |
| 1 | .5 | .5 | 1 | 250 | 900 |
| | | | | 300 | 350 |
| | | | | 350 | 200 |

TABLE VIII

Table VIII shows set times and open times for two adhesive compositions, one containing 1,4-cyclohexane dimethanol dibenzoate and the other containing dicyclohexyl phthalate. This data shows that adhesive compositions with 1,4-cyclohexane dimethanol dibenzoate has faster set times and the same open time as a corresponding adhesive composition containing dicyclohexyl phthalate. Open times were determined pursuant to ASTM D4497-85. Set times were determined by the following test:

The adhesive and a drawdown bar were heated to 350° F. A 1.5 inch by 10 inch strip of 40 lb. Kraft paper was glued to a 40 lb. Kraft paper substrate using the drawdown bar to administer a 10 mil thick film and press the strip to the substrate. Immediately after application, the strip was peeled away from the substrate. The time at which 50% of the paper fiber tore was taken as the set time.

TABLE VIII

| Ratio of Parts by Weight of Adhesive Components | | | | | Set Temp. (°F.) | Open Viscosity (cps) | Set Time (sec) | Open Time (sec) |
|---|---|---|---|---|---|---|---|---|
| Elvax 250 | M-8880 wax | H-100 | 1,4-cyclohexane dimethanol dibenzoate | dicyclohexyl phthalate | | | | |
| 1 | 1 | 1 | — | — | 250 | 1250 | | |
| | | | | | 300 | 450 | | 5 |
| | | | | | 350 | 225 | | |
| 1 | — | 1 | 1 | — | 250 | 2650 | | |
| | | | | | 300 | 950 | | 10 |
| | | | | | 350 | 425 | | |
| 1 | 1 | — | 1 | — | 250 | 525 | | |
| | | | | | 300 | 275 | | 5 |
| | | | | | 350 | 175 | | |
| 1 | .5 | 1 | .5 | — | 250 | 1600 | | |
| | | | | | 300 | 700 | | |
| | | | | | 350 | 325 | | |
| 1 | .5 | .5 | 1 | — | 250 | 900 | | |
| | | | | | 300 | 350 | | 5 |
| | | | | | 350 | 200 | | |
| 1 | .5 | 1 | — | .5 | 250 | 2200 | | |
| | | | | | 300 | 725 | 44 | 15 |
| | | | | | 350 | 350 | | |
| 1 | .5 | 1 | .5 | — | 250 | 1600 | | |
| | | | | | 300 | 575 | 35 | 15 |
| | | | | | 350 | 300 | | |

TABLE IX

Table IX shows the cloud point temperatures and viscosity at specific temperatures for compositions containing 1,4-cyclohexane dimethanol dibenzoate. This table shows that 1,4-cyclohexane dimethanol dibenzoate works well as an adhesive component with polymers other than ethylene vinyl acetate. Kraton D1107 is made by Shell Chemical Corporation. Macromelt 6239 is made by Henkel Corporation. Viscosity was determined using a Brookfield RVT Visometer and Thermosel.

TABLE IX

| Polymer | Type of Polymer | Parts by Weight Polymer | Parts by Weight 1,4-cyclohexane dimethanol dibenzoate | Cloud Point temperature °F. | Viscosity (cps) | Temp (°F.) |
|---|---|---|---|---|---|---|
| Kraton D1107 | Styrene-Isoprene-Styrene Block Copolymer | 75 | 25 | 160 | 9500 | 350 |
|  |  | 90 | 10 | 120 | Too viscous to be measurable |  |
| Macromelt Polyamide 6239 |  | 75 | 25 | <140 | — | — |
|  |  | 90 | 10 | <140 | — | — |

TABLE X

Formulations for FIG. 10
Ratio of Parts by Weight of Adhesive Components

| Formulation | Elvax 250 | M-8880 Wax | H-100 | 1,4-cyclohexane dimethanol dibenzoate | Dicyclohexyl phthalate |
|---|---|---|---|---|---|
| A | 1 | 1 | — | 1 | — |
| B | 1 | .5 | .5 | 1 | — |
| C | 1 | 1 | 1 | — | — |
| D | 1 | .5 | 1 | .5 | — |
| E | 1 | — | 1 | 1 | — |

TABLE XI

Formulations for FIG. 11
Ratio Of Parts By Weight Of Adhesive Components

| Formulation | Elvax 250 | M-8880 Wax | H-100 | 1,4-cyclohexane dimethanol dibenzoate | Dicyclohexyl phthalate |
|---|---|---|---|---|---|
| A | 1 | .5 | 1 | .5 | — |
| B | 1 | .5 | 1 | — | .5 |

OTHER APPLICATIONS AND SUMMARY

Other components besides a polymer, a tackifier, and 1,4-cyclohexane dimethanol dibenzoate can be added to the adhesive compositions of the present invention.

It is expected that 1,4-cyclohexane dimethanol dibenzoate can be used in many other applications besides hot melt adhesive compositions. For example, it is believed that 1,4-cyclohexane dimethanol dibenzoate would work well in latex applications, powdered coating applications, and in heat reactive thermal delayed tack applications. In addition, it is expected that 1,4-cyclohexane dimethanol dibenzoate would work well as a thermoplastic process aid.

The foregoing detailed description of the invention has been made in general terms and with respect to several preferred embodiments. Many of the specific preferred materials, temperatures, and methods stated herein may be varied by persons skilled in the art without departing from the spirit and scope of this invention. Accordingly, the invention resides solely in the claims hereinafter appended.

What is claimed is:

1. A solid non-aqueous hot melt adhesive composition comprising a polymer, a tackifier, a wax, and a plasticizing amount in the range of about 5–40% by weight of 1,4-cyclohexane dimethanol dibenzoate.

* * * * *